United States Patent Office 3,850,922
Patented Nov. 26, 1974

3,850,922
5 - ENDO-BENZOYLOXY - N - [AMINO(LOWER) ALKYL]BICYCLO[2.2.1]HEPTANE - 2,3 - DI-ENDO-CARBOXYLIC ACID IMIDES
Ichiro Matuo, Tokyo, Japan, and Sadao Ohki, 6-24-705 Sengoku 1-chome, Bunkyo-ku, Tokyo, Japan; said Matuo assignor to said Ohki
No Drawing. Continuation-in-part of application Ser. No. 290,596, Sept. 20, 1972. This application Sept. 13, 1973, Ser. No. 396,909
Int. Cl. C07d 87/42
U.S. Cl. 260—247.2 A                 32 Claims

ABSTRACT OF THE DISCLOSURE

A series of 5-endo-benzoyloxy-N-[amino(lower)alkyl] bicyclo[2.2.1]heptane-2,3-di-endo-carboxylic acid imides have been found to possess unique prophylactic and therapeutic activity as anti-arrhythmia agents. An example of such a compound possessing excellent activity is 5-endo-benzoyloxy-N - (3 - dimethylaminopropyl)bicyclo[2.2.1] heptane-2,3-di-endo-carboxylic acid imide hydrochloride.

CROSS-REFERENCE TO RELATED APPLICATION

This application is a continuation-in-part of co-pending application Ser. No. 290,596, filed Sept. 20, 1972.

BACKGROUND OF THE INVENTION

1. Field of the Invention: This invention relates to a novel series of 5-endo-benzoyloxy - N - [amino(lower) alkyl]-bicyclo[2.2.1]heptane-2,3-di-endo-carboxylic acid imides possessing anti-arrhythmic and/or anti-fibrillatory activity.

2. Description of the Prior Art:

A. British Pat. No. 1,042,840 describes compounds having the formula

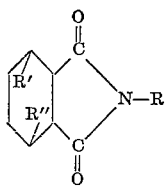

in which each of R' and R" represent hydrogen, or together an alkylene group having 1 or 2 carbon atoms, and R represents an alkyl group having 6 to 18, preferably 8 to 12 carbon atoms in a straight chain as having particularly advantageous properties as functional fluids.

B. U.S. Pat. No. 2,393,999 describes the compounds having the formula

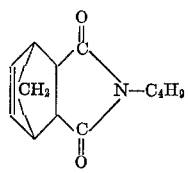

as being an effective insecticide.

C. U.S. Pat. No. 2,424,220 describes the compound having the formula

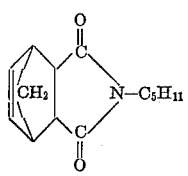

as being an effective insecticide.

D. U.S. Pat. No. 2,462,835 describes the compound having the formula

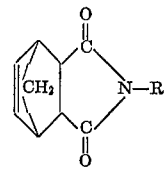

in which R is alkyl, alkene, aryl, substituted aryl, alkynyl, etc. as insecticides.

E. Culberson and Wilder, Jr., J. Org. Chem., 25, pp. 1358–62 (1960) report the preparation of compounds having the formula

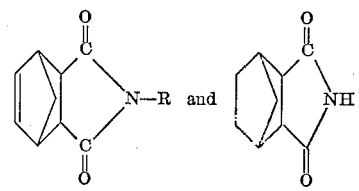

in which R is $CH_3$, $C_6H_{13}$ or hydrogen.

F. Rice, Reide and Grogan, J. Org. Chem., 19, pp. 884–893 (1954) report the preparation of compounds of the formula

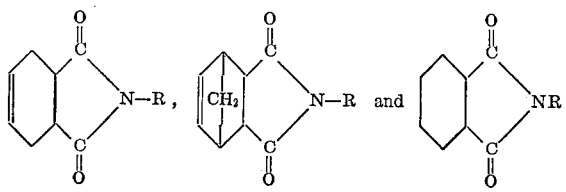

in which R is alkyl and their subsequent reduction with lithium aluminum hydride.

G. Worrall, J. Am. Chem. Soc., 82, pp. 5707–5711 (1960) reports the preparation of compounds having the formula

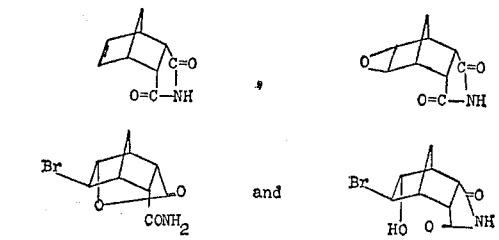

H. German Auslegeschrift No. 1,179,205 reports the preparation of compounds having the formula

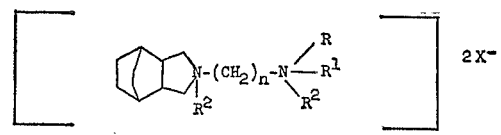

in which the bicyclo[2.2.2]octane ring system is saturated or unsaturated and/or substituted, R and $R^1$ are alkyl or alkenyl groups of 1 to 5 carbon atoms, or when combined with the nitrogen a heterocyclic ring. $R^2$ is a (lower)alkyl group, n is a number of 2 to 5 and X a halogen anion. The quaternary compounds are described as having therapeutic properties in the treatment of cardiovascular diseases, specifically high blood pressure.

SUMMARY OF THE INVENTION

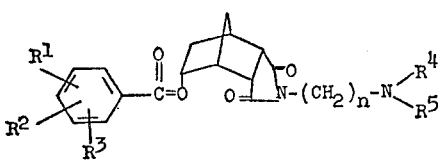

wherein R¹, R² or R³ is H, Cl, Br, F, (lower)alkyl, nitro, OH or (lower)alkoxy, n is an integer of 2 to 4 inclusive and R⁴ or R⁵ is H, (lower)alkyl or when taken together with the nitrogen a radical of the formula

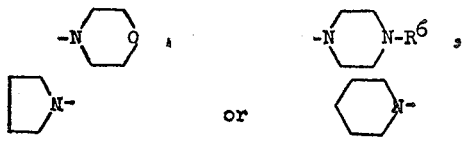

in which R⁶ is (lower)alkyl; or a pharmaceutically acceptable acid addition salt thereof are antiarrhythmic agents.

Cardiac arrhythmia, a phenomenon commonly associated with coronary heart disease or myocardial infarction, is an affliction not uncommon in humans, especially the elderly. The mechanism of cardiac arrhythmia is suspected to be caused by an abnormal "focus" in the ventricle of the heart which sends out (fires) nerve signals more rapidly than required for the normal beating of the heart. Uncontrolled arrhythmia can lead to fibrillation which results in death.

It has been discovered that the series of compounds herein designated 5-endo-benzoyloxy-N-[amino-(lower)alkyl]-bicyclo[2.2.1]heptane - 2,3-di-endo-carboxylic acid imides having the formula

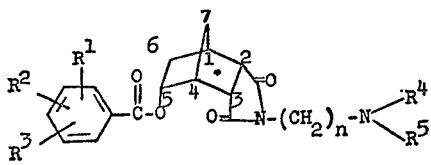

wherein R¹, R² or R³ is H, Cl, Br, F, (lower)alkyl, nitro, OH or (lower)alkoxy, n is an integer of 2 to 4 inclusive and R⁴ or R⁵ is H, (lower)alkyl or when taken together with the nitrogen a radical of the formula

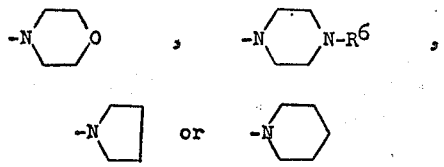

in which R⁶ is (lower)alkyl; or a pharmaceutically acceptable acid addition salt thereof are useful therapeutic or prophylactic agents in the suppression of the abnormal ectopic beat.

Compound I can theoretically exist in several isomeric forms, namely;

A. endo-aroyloxy:endo-substituted imide;
B. exo-aroyloxy:exo-substituted imide (X);
C. endo-aroyloxy:exo-substituted imide; and
D. exo-aroyloxy:endo-substituted imide.

Furthermore, each of these isomers has two optical isomers; levorotatory and dextrorotatory.

The distinction between the isomers is determined by the relative position of the constituent bonds at positions 2, 3 and 5 of the bicyclo ring system.

When these bonds, i.e., the constituent bonds at positions 2, 3 and 5, are on the same side as the C₇ bridge, we have the exo-exo isomer. When these bonds, i.e., the constituent bonds at positions 2, 3 and 5 are on the opposite side of the C₇ bridge or alternately within the cage formed by carbon atoms 2, 3, 5 and 6, then we have the endo-endo isomer. When the constituent bond at position 5 is on the same side as the C₇ bridge and the constituents bond 2 and 3 are on the opposite side of the C₇ bridge, then we have the exo(5-position)-endo(2,3-position) isomer. When the constituent bond at position 5 is on the opposite side of the C₇ bridge and the constituents bonds 2 and 3 on the same side as the C₇ bridge, we have the endo-exo isomer. Illustrative of the exo-exo isomer is the compound having the formula

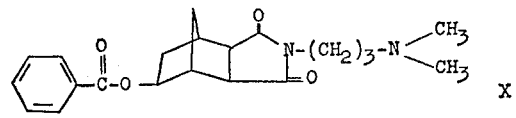

Illustrative of endo-endo is the compound of formula I.

The only isomers claimed in this invention are the endo-endo isomers as represented by compound I and the dextro- and levorotatory isomers thereof. The endo-endo isomers are inherently exclusively produced by the synthesis described herein.

Some exo-endo isomers have been prepared by another synthetic route and have been found to be inactive in regulating cardiac arrhythmia, e.g., 5-exo-benzoyloxy-N-(3-dimethylaminopropyl)-bicyclo[2.2.1]heptane - 2,3 - di-endo-carboxylic acid imide hydrochloride.

The optical isomers can be separated and isolated by fractional crystallization of the diastereoisomeric salts formed, for instance, with (+) or (−)-tartaric acid or D-(−)-camphor sulfonic acid (see experimental).

For the purpose of this disclosure, the term "(lower)alkyl" is defined as an alkyl radical containing 1 to 6 carbon atoms. The term "(lower)alkoxy" is an alkoxy radical containing 1 to 6 carbon atoms. The term "pharmaceutically acceptable acid addition salt" is defined to include all those inorganic and organic acid salts of the compounds of the instant invention, which salts are commonly used to produce nontoxic salts of medicinal agents containing amine functions. Illustrative examples would be those salts formed by mixing the compounds of formula I with hydrochloric, sulfuric, nitric, phosphoric, phosphorous, hydrobromic, maleic, malic, ascorbic, citric or tartaric, pamoic, lauric, stearic, palmitic, oleic, myristic, laurylsulfonic, naphthalenesulfonic, linoleic or linolenic acid, and the like.

A preferred embodiment of the present invention is the compound having the formula

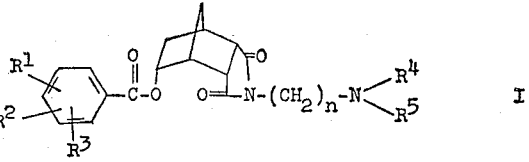

wherein R¹, R² or R³ is H, Cl, Br, F, (lower)alkyl, nitro, OH or (lower)alkoxy, n is an integer of 2 to 4 inclusive and R⁴ or R⁵ is H, (lower)alkyl or when taken together with the nitrogen a radical of the formula

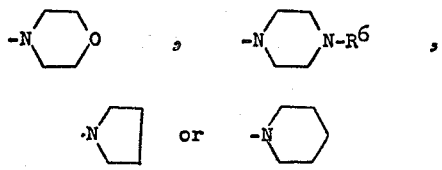

in which R⁶ is (lower)alkyl; or a pharmaceutically acceptable acid addition salt thereof.

Another preferred embodiment of the present invention is the compound having the formula

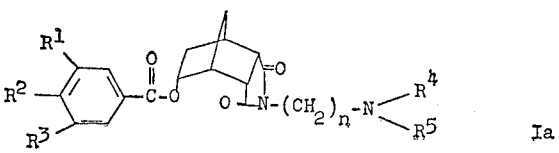

wherein $R^1$, $R^2$ or $R^3$ is H, Cl, Br, F, (lower)alkyl, nitro, OH or (lower)alkoxy, $n$ is an integer of 2 to 4 inclusive and $R^4$ and $R^5$ are H, (lower)alkyl or when taken together with the nitorgen a radical of the formula

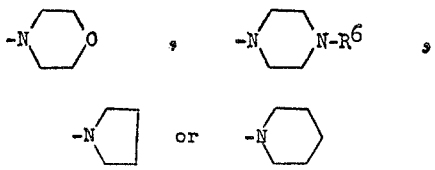

in which $R^6$ is (lower)alkyl; or a pharmaceutically acceptable acid addition salt thereof.

Another preferred embodiment is the compound of formula Ia wherein $R^1$, $R^2$ or $R^3$ is H, F, Cl, nitro or (lower)alkoxy, $R^4$ and $R^5$ are H, (lower)alkyl or when taken together with the nitrogen a radical of the formula

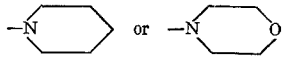

Another preferred embodiment is the compound of formula Ia wherein $R^1$, $R^2$ and $R^3$ are (lower)alkoxy, $R^4$ and $R^5$ are (lower)alkyl or when taken together with the nitrogen a radical of the formula

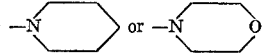

Another preferred embodiment is the compound of formula Ia wherein $R^1$ and $R^3$ are hydrogen, $R^2$ is $NO_2$, hydrogen or chloro, $R^4$ and $R^5$ are (lower)alkyl or when taken together with the nitrogen a radical of the formula

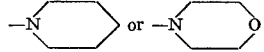

A more preferred embodiment is the compound of formula Ia wherein $R^1$ and $R^3$ are hydrogen, $R^2$ is chloro, $n$ is an integer of 3 and $R^4$ and $R^5$ are methyl; or the hydrochloride salt thereof.

A most preferred embodiment of the present invention is the compound of formula Ia wherein $R^1$, $R^2$ and $R^3$ are hydrogen, $n$ is an integer of 3 and $R^4$ and $R^5$ are methyl; or the hydrochloride salt thereof.

A more preferred embodiment is the compound of formula Ia wherein $R^1$, $R^2$ and $R^3$ are hydrogen, $n$ is an integer of 2 and $R^4$ and $R^5$ are methyl; or the hydrochloride salt thereof.

A more preferred embodiment is the compound of formula Ia wherein $R^1$ and $R^3$ are hydrogen, $R^2$ is nitro, $n$ is an integer of 3 and $R^4$ and $R^5$ taken together with nitrogen is a radical of the formula

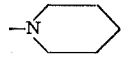

or the hydrochloride salt thereof.

A more preferred embodiment is the compound of formula Ia wherein $R^1$, $R^2$ and $R^3$ are methoxy, $n$ is an integer of 3 and $R^4$ and $R^5$ are methyl; or the hydrochloride salt thereof.

A more preferred embodiment is the compound of formula Ia wherein $R^1$, $R^3$ and $R^2$ are methoxy, $n$ is an integer of 2 and $R^4$ and $R^5$ are methyl; or the hydrochloride salt thereof.

A more preferred embodiment is the compound of formula Ia wherein $R^1$ and $R^3$ are hydrogen, $R^2$ is chloro, $n$ is an integer of 3 and $R^4$ and $R^5$ taken together with the nitrogen is a radical of the formula

of the hydrochloride salt thereof.

A more preferred embodiment is the compound of formula Ia wherein $R^1$ and $R^3$ are hydrogen, $R^2$ is nitro, $n$ is an integer of 3 and $R^4$ and $R^5$ when taken together with the nitrogen is a radical of the formula

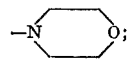

of the hydrochloride salt thereof

A more preferred embodiment is the compound of formula Ia wherein $R^1$ and $R^3$ are hydrogen, $R^2$ is chloro, hydrogen or nitro, $n$ is an integer of 3 and $R^4$ and $R^5$ are each lower)alkyl; or the hydrochloride salt thereof.

A more preferred embodiment is the compound of formula Ia wherein $R^1$ and $R^3$ are hydrogen, $R^2$ is nitro, $n$ is an integer of 3 and $R^4$ and $R^5$ are methyl; or the hydrochloride salt thereof.

A most preferred embodiment is the essentially pure levorotatory isomers of the compound of formula Ia.

Another most preferred embodiment is the essentially pure dextrorotatory isomers of the compound of Ia.

The most preferred embodiment of the present invention is the dextrorotatory isomer of the compound Ia wherein $R^1$, $R^2$ and $R^3$ are hydrogen, $n$ is 3 and $R^4$ and $R^5$ are methyl; or the hydrochloride salt thereof.

Another most preferred embodiment of the present invention is the levorotatory isomer of the compound Ia wherein $R^1$, $R^2$ and $R^3$ are hydrogen, $n$ is 3 and $R^4$ and $R^5$ are methyl; or the hydrochloride salt thereof.

The objectives of the present invention have been achieved by the process of preparing the compounds having the formula

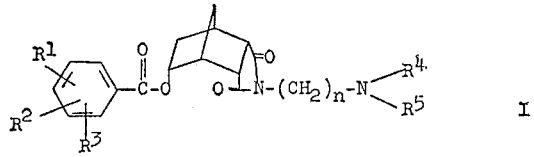

wherein $R^1$, $R^2$ or $R^3$ is H, Cl, Br, F, (lower)alkyl, nitro, OH or (lower)alkoxy, $n$ is an integer of 2 to 4 inclusive and $R^4$ and $R^5$ are H, (lower)alkyl or when taken together with the nitrogen a radical of the formula

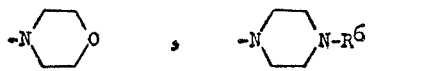

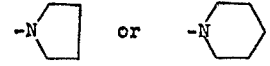

in which $R^6$ is (lower)alkyl; which process comprises the consecutive steps of A. treating a suspension of *endo-cis*-bicyclo[2.2.1]hept-5-ene-2,3-dicarboxylic anhydride or *exo-cis*-bicyclo[2.2.1]hept-5-ene-2,3-dicarboxylic anhydride in water, but preferably the *endo-cis* isomer, with excess concentrated sulfuric acid at a temperature in the range of 70–95° C. to produce the *endo-endo* compound having the formula

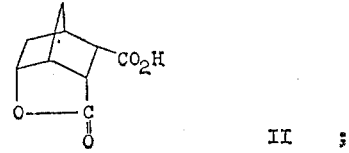

B. treating 1 mole of compound II with at least one mole of acetyl chloride or phosphorous trichloride at reflux temperature for at least 15 minutes and removing the excess acetyl chloride or phosphorous trichloride *in vacuo* to produce an oily residue IIa;

C. treating residue IIa with at least one mole of an amine having the formula

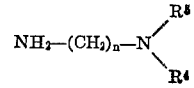

in which $n$ is an integer of 2 to 4 inclusive, $R^4$ or $R^5$ are

H, (lower)alkyl or when both are taken with the nitrogen a radical of the formula

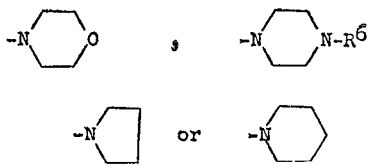

in which $R^6$ is (lower)alkyl; in an organic solvent, preferably selected from the group comprising benzene, toluene, xylene, and the like at about reflux temperatures for at least 30 minutes and removing the solvent *in vacuo* to produce an oily residue IIb;

D. treating residue IIb with at least one mole of potassium hydroxide in a mixture of a (lower)alkanol and water with the aid of heat, but preferably at reflux temperature for at least one hour to produce the compound having the formula

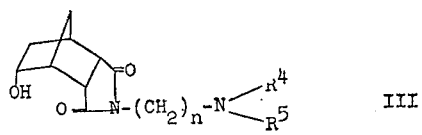

in which $n$, $R^4$ and $R^5$ are as above; and

E. treating one mole of compound III with at least one mole of a benzoyl halide, or its chemical equivalent, having the formula

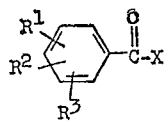

in which $R^1$, $R^2$ and $R^3$ are as defined above and X is chloro, bromo or iodo, but preferably chloro, in an organic solvent, preferably selected from the group comprising benzene, toluene, xylene, pyridine, but preferably pyridine, in a temperature range of 0° C. to 60° C., but preferably at about room temperature to yield compound I.

PHARMACOLOGY

Acute intravenous $LD_{50}$'s (lethal dose in 50% of the animals tested) with 95% confidence limits were obtained for compounds Ib [(Racemic) (±)-5-*endo*-Benzoyloxy-N - (3 - dimethylaminopropyl)bicyclo[2.2.1]heptane-2,3-*endo*-dicarboxylic acid imide hydrochloride], V [(−)-5-*endo* - Benzoyloxy - (3 - dimethylaminopropyl)bicyclo[2.2.1]heptane-2,3-*endo*-dicarboxylic acid imide hydrochloride and VI [(+)-5-*endo*-Benzoyloxy-(3-dimethylaminopropyl)bicyclo[2.2.1]heptane - 2,3 - *endo* - dicarboxylic acid imide hydrochloride as follows:

| Species | Compound | $LD_{50}$ with 95% confidence limits, mg./kg. |
|---|---|---|
| Mouse | Ib | 26 (23–20.4) |
|  | V | 43.5 (40.7–26.5) |
|  | VI | 14.5 (12.2–16) |
| Rat | Ib | 25 (23.6–26.5) |
|  | V | 39 (35.9–42.3) |
|  | VI | 21 (18.6–23.7) |

The compounds were tested in dogs for their reversion activity in ouabain-induced arrhythmia:

Anesthetized dogs were used for the production of ouabain-induced ventricular arrhythmias. The arrhythmia consisted of a nodal or ventricular tachycardia. The procedure used to establish the arrhythmia as well as the criteria employed to determine anti-arrhythmic activity generally was that employed by Lucchesi et al.[1]. Intravenous infusion of Ib, V and VI was done at a rate of 0.2 mg./kg./min. and compared to lidocaine and quinidine. The average reverting doses are shown below.

| Compound | Reverting Dose, mg./kg. |
|---|---|
| Ib | 1.7 |
| V | 2.3 |
| VI | 2.8 |
| Quinidine | 4.9 |
| Lidocaine | 6.6 |

The compounds were also tested for their reversion of ventricular arrhythmia due to coronary artery ligation in conscious dogs:

Multifocal ventricular ectopic rhythms were produced in dogs according to the coronary artery ligation method of Harris.[2]. Approximately 24 hours after induction of the ventricular arrhythmia the test drugs were infused at a rate of 0.2 mg./kg./min. The approximate average doses necessary to produce a 50% decrease in the number of ventricular ectopic beats, and to produce reversion of the ventricular arrhythmia are shown below. In contrast to Ib and VI, no reversion was observed with an intravenous infusion of lidocaine or quinidine in doses of up to 20 mg./kg.

| Compound | Dose producing 50% reduction in ectopic beats | Reverting dose (mg./kg.) |
|---|---|---|
| Ib | 2.4 | 10 |
| V | 3.3 | >11 |
| VI | 3.0 | 7 |
| Lidocaine | >20 | >20 |
| Quinidine | 10.1 | >20 |

All the compounds within the scope of the present invention possess anti-arrhythmic activity.

The compounds of the present invention are useful in the treatment of cardiac arrhythmia in mammals, including man, as prophylactic or therapeutic agents in doses in the range of 0.25 mg. to 3.0 mg./kg. up to 3 or 4 times a day.

The compounds of the instant invention, and the salts thereof, are known to form mono- and polyhydrates. These hydrates are also considered to be an integral part of the instant invention.

EXPERIMENTAL

Example 1

Preparation of Bicyclo[2.2.1]heptane-*endo*-2,3-dicarboxylic acid-5-*endo*-hydroxy-γ-lactone (II)

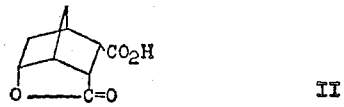

Five hundred grams (500 g.) of concentrated sulfuric acid was slowly added with vigorous stirring to a suspension of 164 g. of *endo-cis*-bicyclo[2.2.1]hept-5-ene-2,3-dicarboxylic anhydride in 500–600 ml. of water. The reaction was exothermic and the temperature rose to about 80–90° C. during the addition of the sulfuric acid. Two liters of boiling water was added to the reaction solution and immediately filtered. As the filtrate cooled, colorless platelets of the title product (II) crystallized. On completion of the crystallization, the crystals were collected by filtration, the crystals were collected by filtration and washed with cold water to produce 138 grams of air-dried crystals, m.p. 200° C.

---

[1] Lucchesi, B. L., and H. F. Hardman: The influence of dichloroisoproterenol (DCI) and related compounds upon ouabain and acetylstrophanthidin induced cardiac arrhythmias, J. Pharmacol. Exp. Therap., 132:372, 1961.

[2] Harris, A. S.: Delayed development of ventricular ectopic rhythms following experimental coronary occlusion. Circulation 1:1318, 1950.

Example 2

General method of preparation of 5-*endo*-hydroxy-N-[amino(lower)alkyl]bicyclo[2.2.1]heptane - 2,3 - di-*endo*-carboxylic acid imides (III)

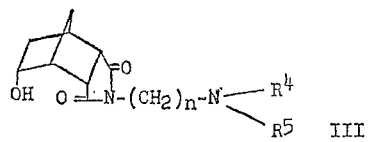

A mixture of 0.1 mole of lactone (II) from example 1 and 50 ml. of acetyl chloride was refluxed on a water bath for two hours. The excess acetyl chloride was removed in vacuo and an oily residue (IIa) remained that was washed with n-hexane (or petroleum ether). The oily residue was dissolved in 50 ml. of anhdyrous benzene. To this solution was added a solution of 0.12 moles of the appropriate amine, e.g., N,N-dimethylaminopropylamine, and 100 ml. of anhydrous benzene with stirring. The mixture was then refluxed for about five hours and concentrated *in vacuo*. The resultant brown syrupy substance (IIb) was refluxed for five hours in 300 ml. of 0.12 mole of potassium hydroxide and 50% water-ethanol. The solvents were removed *in vacuo*, saturated potassium carbonate solution added and the resultant solution extracted repeatedly using chloroform or 1:1 ethyl acetate-benzene. The collective organic extracts were washed with saturated sodium chloride solution and dried over anhydrous sodium sulfate. After filtration, the solution was concentrated *in vacuo* and the product was recovered by crystallization, chromatography and/or vacuum distillation wherein in formula III, $n$ is an integer of 2 to 4 inclusive, $R^4$ and $R^5$ are H, (lower)alkyl or when taken together with the nitrogen a radical of the formula

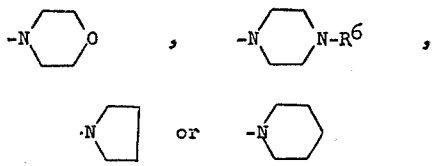

in which $R^6$ is (lower)alkyl.

Example 3

General method of preparation of 5-*endo*-benzoyloxy-N-[amino(lower)alkyl]bicyclo[2.2.1]heptane - 2,3 - di-*endo*-carboxylic acid imides (I)

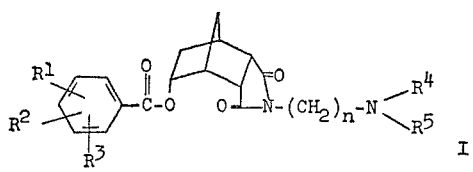

The 5-*endo* - Hydroxy-N-[amino(lower)alkyl]bicyclo-[2.2.1]heptane-2,3-di-*endo*-carboxylic acid imide (III) (0.01 mole) obtained in example 2 was added to 50 ml. of a 100:1 pyridine-piperidine solution of 0.012 mole of an appropriate benzoyl halide, e.g., benzoyl chloride, with stirring. The resultant mixture was allowed to stand overnight in a refrigerator or warmed in a water or oil bath. The mixtue was poured into ice-water and saturated with sodium carbonate and then extracted with chloroform or 1:1 benzene-ethyl acetate. The combined organic extracts were washed with saturated sodium chloride solution and dried over anhydrous sodium sulfate. The solution was collected by filtration and concentrated *in vacuo* to yield the desired title product (I).

Example 4

Alternate method of preparation of 5-*endo*-hydroxy-N-[amino(lower)alkyl]bicyclo[2.2.1]heptane - 2,3 - di-*endo*-carboxylic acid imides (III)

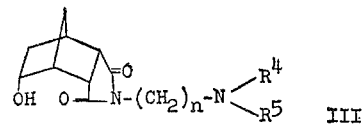

A mixture of 0.1 mole of lactone (II) from example 1 above and 30 ml. of $PCl_3$ was refluxed in a water bath for two hours. The excess $PCl_3$ was removed *in vacuo* and washed with n-hexane. The oily residue was dissolved in 50 ml. of chloroform or methylene chloride and a solution of 0.12 mole of an appropriate amine, e.g., N,N-dimethylaminopropylamine, dissolved in 100 ml. of anhydrous chloroform or methylene chloride was added with stirring and cooling. Stirring was continued for two hours, following which the mixture was warmed to room temperature following which the mixture was refluxed for about 15 minutes. The solution was washed with saturated potassium carbonate solution after cooling, separated, and the organic phase washed with saturated sodium chloride solution. The organic solution was dried over anhydrous sodium sulfate, filtered, and concentrated *in vacuo*. The material subsequently collected was the title product of formula III wherein $n$ is an integer of 2 to 4 inclusive, $R^4$ or $R^5$ is H, (lower)alkyl or when taken together with the nitrogen a radical of the formula

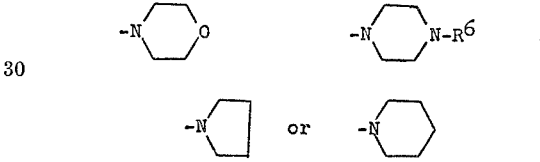

in which $R^6$ is (lower)alkyl.

Example 5

Preparation of 5-*endo*-hydroxy-N-(3-dimethylaminopropyl)-bicyclo[2.2.1]-heptane - 2,3 - di - *endo*-carboxylic acid imide (IIIa)

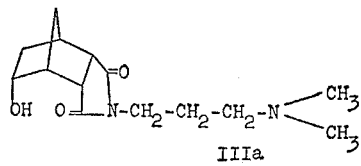

Substitution in the procedure of example 2 or 4 of an equimolar quantity of N,N-dimethylaminopropylamine for the "appropriate" amine used therein produced the title product as colorless plates when crystallized from ethanol-n-hexane; m.p. 148° C. (1¾$H_2O$) or 154° C. (⅓$H_2O$). Yield: 26-37%.

Anal.
Calc'd for $C_{14}H_{22}O_3N_2 \cdot 1¾ H_2O$: C, 56.42; H, 8.79; N, 9.40.
Found: C, 56.70; H, 8.76; N, 9.11.

Anal.
Calc'd for $C_{14}H_{22}O_3N_2 \cdot ⅓ H_2O$: C, 61.76; H, 8.45; N, 10.29.
Found: C, 61.93; H, 8.76; N, 10.40.

Example 6

Preparation of 5-*endo*-benzoyloxy-N-(3-dimethylaminopropyl)bicyclo[2.2.1]heptane - 2,3 - di - *endo*-carboxylic acid imide (Ib)

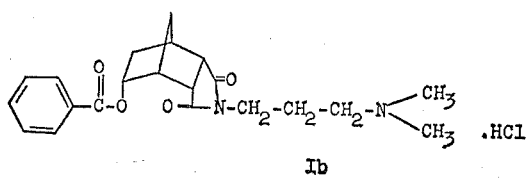

A. Substitution in the procedure of example 3 of an equimolar quantity of benzoyl chloride for the "appropriate" benzoyl halide used therein and for the dicarboxylic acid imide III an equimolar quantity of IIIa obtained in example 5 produced the title product which was collected as the hydrochloride salt.

B. The free base was dissolved in near boiling ethanol (700 ml.) and 90 ml. of ethanol saturated with hydrogen chloride gas was added. The solution was cooled with ice to produce colorless plates of the hydrochloride salt of formula Ib; m.p. 239° C. with decomposition upon recrystallization from methanol-acetone. Yield—90%.

*Anal.*

Calc'd for $C_{21}H_{27}O_4N_2Cl \cdot \frac{1}{3}H_2O$: C, 61.07; H, 6.83; N, 6.95.

Found: C, 60.63; H, 6.88; N, 7.33.

Example 7

Preparation of 5-*endo*-3,4,5-trimethoxybenzoyloxy-N-(3-dimethylaminopropyl)-bicyclo[2.2.1]heptane - 2,3 - di-*endo*-carboxylic acid imide hydrochloride (Ic)

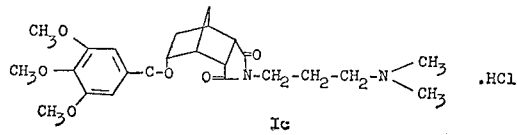

Substitution in the procedure of example 3 for the "appropriate" benzoyl halide used therein of an equimolar quantity of 3,4,5-trimethoxybenzoyl chloride and for the dicarboxylic acid imide III an equimolar quantity of IIIa produced the title compound which was collected as the hydrochloride salt (using a method equivalent to that employed in example 6B). The hydrochloride was collected as colorless plates upon recrystallization from water-ethanol; m.p. 250.2° C.; yield: 22%.

*Anal.*

Calc'd for $C_{24}H_{31}O_7N_2 \cdot HCl \cdot H_2O$: C, 56.96; H, 6.77; N, 5.54.

Found: C, 56.64; H, 6.76; N, 5.59.

Example 8

Preparation of 5-*endo*-4-nitrobenzoyloxy-N-(3-dimethylaminopropyl)bicyclo[2.2.1]heptane - 2,3 - di-*endo*-carboxylic acid imide hydrochloride (Id)

Substitution in the procedure of example 3 for the "appropriate" benzoyl halide used therein of an equimolar quantity of 4-nitrobenzoyl chloride and for the dicarboxylic acid imide III an equimolar quantity of IIIa produced the title compound which was collected as the hydrochloride salt (using a method comparable to that employed in example 6B). The hydrochloride salt was collected as pale yellow plates upon recrystallization from water-ethanol; m.p. 197° C. Yield—30%.

*Anal.*

Calc'd for $C_{21}H_{25}O_6N_3 \cdot HCl \cdot 2H_2O$: C, 51.68; H, 6.20; N, 8.61.

Found: C, 51.35; H, 6.35; N, 8.58.

Example 9

Preparation of 5-*endo*-4-chlorobenzoyloxy-N-(3-dimethylaminopropyl)bicyclo[2.2.1]heptane - 2,3 - di-*endo*-carboxylic acid imide hydrochloride (Ie)

Substitution in the procedure of example 3 for the "appropriate" benzoyl halide used therein of an equimolar quantity of 4-chlorobenzoyl chloride and for the dicarboxylic acid imide III an equimolar quantity of IIIa produced the title compound which was collected as the hydrochloride (using a method comparable to that employed in example 6B). The hydrochloride was collected as colorless plates upon recrystallization from water-ethanol; m.p. 208° C.

*Anal.*

Calc'd for $C_{21}H_{25}O_4N_2Cl \cdot 1\frac{1}{2}H_2O$: C, 54.01; H, 6.26; N, 6.00.

Found: C, 53.84; H, 5.91; N, 6.14.

Example 10

Preparation of 5-*endo*-hydroxy-N-(2 - dimethylaminoethyl)bicyclo[2.2.1]heptane - 2,3 - di-*endo*-carboxylic acid imide (IIIb)

Substitution in the procedure of example 4 for the "appropriate" amine used therein of an equimolar quantity of N,N-dimethylethylamine produced the title product which was collected as the hydrochloride using a method comparable to that employed in example 6B. The free base was collected as colorless plates upon recrystallization from ethanol-n-hexane; m.p. 141.5° C. Yield: 50%.

*Anal.*

Calc'd for $C_{13}H_{20}O_3N_2 \cdot \frac{1}{3}H_2O$: C, 60.46; H, 8.13; N, 10.85.

Found: C, 60.71; H, 8.04; N, 10.95.

Example 11

Preparation of 5-*endo*-hydroxy-N-(2-diethylaminoethyl)bicyclo[2.2.1]heptane-2,3-di-*endo*-carboxylic acid imide phenolphthalinate (IIIc)

Substitution in the procedure of example 2 for the "appropriate" amine used therein of an equivalent amount of N,N-diethylaminoethylamine produced the title product as yellow oil, b.p. 213–220° C./5 mm. Hg. Yield: 37%. The product was further characterized as the phenolphthalinate salt, m.p. 137.8–138.8° C.

*Anal.*

Calc'd for $C_{35}H_{40}O_7N_2 \cdot 1\frac{1}{2}H_2O$: C, 67.04; H, 6.91; N, 4.48.

Found: C, 67.38; H, 7.41; N, 4.23.

Example 12

Preparation of 5-*endo*-3,4,5-trimethoxybenzoyloxy-N-(2-diethylaminoethyl)bicyclo[2.2.1]heptane-2,3-di - *endo*-carboxylic acid imide hydrochloride (If)

Substitution in the procedure of example 3 for the "appropriate" benzoyl halide used therein of an equimolar amount of 3,4,5-trimethoxybenzoyl chloride and for the dicarboxylic acid imide III used therein an equimolar quantity of IIIc produced the title product which was collected as the hydrochloride (using a method comparable to that employed in example 6B). The hydrochloride was collected as hell brown plates upon recrystallization from ethanol-ethyl acetate, m.p. 174.5° C.

*Anal.*

Calc'd for $C_{25}H_{35}O_7N_2Cl$: C, 58.76; H, 6.90.

Found: C, 58.22; H, 6.96.

Example 13

Preparation of 5-*endo*-hydroxy-N-(3-diethylaminopropyl)bicyclo[2.2.1]heptane-2,3-di-*endo*-carboxylic acid imide phenolphthalinate (IIIf)

Substitution in the procedure of example 2 for the "appropriate" amine used therein of an equivalent amount of N,N-diethylaminopropylamine produced the title product as a yellow oil, b.p. 228–230° C./6 mm. Hg. Yield: 34%. The product was further characterized as the phenolphthalinate salt, m.p. 155–158° C.

*Anal.*

Calc'd for $C_{36}H_{42}O_7N_2 \cdot 1\frac{1}{2}H_2O$: C, 67.39; H, 7.02; N, 4.36.

Found: C, 67.77; H, 6.79; N, 4.36.

Example 14

Preparation of 5-*endo*-hydroxy-N-(3-piperidinopropyl)bicyclo[2.2.1]heptane - 2,3 - di-*endo*-carboxylic acid imide (IIIe)

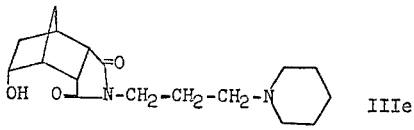

Substitution in the procedure of example 4 for the "appropriate" amine used therein of an equivalent amount of 3-piperidinopropylamine produced the title product as colorless plates upon recrystallization from isopropanol-n-hexane, m.p. 121.5° C. Yield: 50%.

*Anal.*

Calc'd for $C_{17}H_{26}O_3N_2 \cdot \frac{1}{4}H_2O$: C, 65.70; H, 8.53; N, 9.01.
Found: C, 66.05; H, 9.03; N, 9.06.

Example 15

Preparation of 5-*endo*-hydroxy-N-(2-morpholinoethyl)-bicyclo[2.2.1]heptane - 2,3 - di-*endo*-carboxylic acid imide hydrochloride (IIIf)

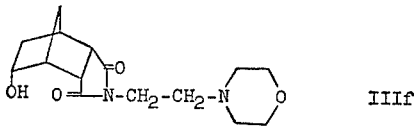

Substitution in the procedure of example 2 or 4 for the "appropriate" amine used therein of an equivalent amount of morpholinoethylamine produced the title compound which was collected as the hydrochloride (using a method comparable to that employed in example 6B). The hydrochloride was collected as colorless plates upon recrystallization from water-ethanol, m.p. 280–282° C. Yield: 30–34%.

*Anal.*

Calc'd. for $C_{15}H_{22}O_4N_2 \cdot HCl$: C, 54.43; H, 7.00; N, 8.46.
Found: C, 54.26; H, 7.56; N, 8.50.

Example 16

Preparation of 5-*endo*-hydroxy-N-(3-morpholinopropyl)-bicyclo[2.2.1]heptane - 2,3 - di-*endo*-carboxylic acid imide (IIIg)

Substitution in the procedure of example 2 for the "appropriate" amine used therein of an equivalent amount of morpholinopropylamine produced the title product as a yellow oil, b.p. 260–270° C./4 mm. Hg; yield 50%. The product was further characterized as the methiodide salt; m.p. 233° C.

*Anal.*

Calc'd for $C_{16}H_{24}O_4N_2 \cdot CH_3I$: N, 6.20.
Found: N, 6.28.

Example 17

Preparation of 5-*endo*-4-nitrobenzoyloxy-N-(3-morpholinopropyl)bicyclo[2.2.1]heptane - 2,3 - di - *endo* - carboxylic acid imide (Ig)

Substitution in the procedure of example 3 for the "appropriate" benzoyl halide used therein of an equivalent amount of 4-nitrobenzoyl chloride and for the dicarboxylic acid imide III used therein an equimolar quantity of IIIg produced the title product as colorless plates upon crystallization from acetone-n-hexane, m.p. 182.5° C.

*Anal.*

Calc'd for $C_{23}H_{27}O_7N_3$: C, 60.39; H, 5.91; N, 9.19.
Found: C, 60.58; H, 6.32; N, 9.28.

Example 18

Preparation of 5-*endo*-4-chlorobenzoyloxy-N-(3-morpholinopropyl)bicyclo[2.2.1]heptane - 2,3 - di - *endo* - carboxylic acid imide hydrochloride (Ih)

Substitution in the procedure of example 3 for the "appropriate" benzoyl halide used therein of an equivalent amount of 4-chlorobenzoyl chloride and for the dicarboxylic acid imide III used therein an equimolar quantity of IIIg produced the title product which was collected as the hydrochloride (using a method comparable to that employed in example 6B). The hydrochloride was collected as colorless plates upon recrystallization from water-ethanol, m.p. 272.4° C.

*Anal.*

Calc'd for $C_{23}H_{28}O_5N_2Cl_2 \cdot \frac{1}{3}H_2O$: C, 56.44; H, 5.93; N, 5.75.
Found: C, 56.40; H, 5.83; N, 5.72.

Example 19

General procedure for the separation of racemic 5-*endo*-benzyloxy - N - [amino(lower)alkyl]-bicyclo[2.2.1]heptane-2,3-di-*endo*-carboxylic acid imides into its (+) and (−) enantiomers 1. Treatment of the racemic bases with (+)-10-camphorsulfonic acid in ethanol-water gave the diastereoisomeric salt of the (−)-isomer. Decomposition of this salt with aqueous sodium carbonate afforded the (−)-enantiomer which was converted to the hydrochloride with ethanolic hydrogen chloride.

2. The mother liquor from the first step was concentrated to leave a mixture of diastereoisomeric salts. Neutralization of this mixture with aqueous sodium carbonate gave a mixture of the (+)- and (−)-isomers, which was greatly enriched in the (+)-enantiomer. In one small scale experiment it was possible to obtain substantially pure (+)-isomer by recrystallization from cyclohexane. In larger scale experiments, it was more expedient to purify the mixture through diastereoisomer formation with (−)-tartaric acid to give the salt of (−)-tartaric acid with the (+)-enantiomer, which is subsequently decomposed to produce the (+)-enantiomer.

Example 20

Resolution of (+)-5-*endo*-benzoyloxy - N - (3-dimethylaminopropyl)bicyclo[2.2.1]heptane - 2,3 - di-*endo*-carboxylic acid imide hydrochloride (Ib)

I. Preparation of the (−)-enantiomer

A. (+)-5-*endo*-benzoyloxy - N - (3 - dimethylaminopropyl)bicyclo[2.2.1]heptane - 2,3 - di - *endo*-carboxylic acid imide (Ib).—A stirred mixture of the hydrochloride salt of Ib (10 g.) in water (150 ml.) and ether (200 ml.) was neutralized by the addition of sodium carbonate. The aqueous layer was re-extracted with ether (2× 200 ml.). The combined ethereal extracts were washed with water, followed by water saturated with sodium chloride (3×) and dried (sodium sulfate). Removal of the ether left colorless crystals of the racemic base Ib (9.3 g.), m.p. 106–107.5°.

B. (+)-10-camphorsulfonic acid salt of (−)-5-*endo*-benzoyloxy - N - (3-dimethylaminopropyl)bicyclo[2.2.1]heptane-2,3-di-*endo*-carboxylic acid imide.—A hot solution of (+)-10-camphorsulfonic acid (276.5 g., 1.19 mole) in ethanol (1.1 l.) was added to a hot solution of the racemic base Ib (441.1 g., 1.19 mole) in ethanol (3.4 l.) containing water (175 ml.). The solution was heated to near boiling and then rapidly cooled to 20°. The colorless crystalline material which formed during 3 hours standing at 20° was collected and washed with cold ethanol (600 ml.) to give 325.3 g. of the title product, m.p. 221–226°. The salt was recrystallized from acetonitrile to give colorless needles (282.6 g.), m.p. 230–233°.

The ethanolic mother liquor was retained for isolation of the (+)-isomer.

C. (−)-5-*endo*-benzoyloxy-N-(3 - dimethylaminopropyl)bicyclo[2.2.1]heptane - 2,3 - di-*endo*-carboxylic acid imide.—The camphorsulfonic acid salt from step B (282.6 g.) was partitioned between a stirred mixture of ethyl acetate (3.4 l.) and water (3 l.) containing sodium carbonate (150 g.). The aqueous layer was reextracted with ethyl acetate (600 ml.). The combined ethyl acetate extracts were washed with water, saturated with sodium chloride (3x), and dried (sodium sulfate). Removal of the ethyl acetate left the title product as colorless crystals (173.3 g.): m.p. 131.5–132.5° ; $[\alpha]_D^{25}$ −78.53° (c. 4.26, ethanol).

D. (−)-5-*endo*-benzoyloxy-N-(3 - dimethylaminopropyl)bicyclo[2.2.1]heptane - 2,3 - di-*endo*-carboxylic acid imide hydrochloride (IV).—To a near boiling solution of the (−)-isomer (173.3 g., 0.468 mole) from step C in 95% ethanol (3.5 l.) was added 475 ml. of 95% ethanol, 0.988 molar in hydrogen chloride (0.68 mole of HCl). The solution was cooled in ice. The colorless crystals were collected, washed with cold 95% ethanol (600 ml.) and dried to give the title product (182.6 g.): m.p .207–209°; $[\alpha]_D^{25}$ −85.56° (c. 1.5, water). The m.p. and rotation were not significantly changed upon further recrystallization from 95% ethanol.

II. *Preparation of the (+)-enantiomer*

A. (−)-tartaric acid salt of (+)-5-*endo*-benzoyloxy-N - (3 - dimethylaminopropyl)bicyclo[2.2.1]heptane-2,3-di-*endo*-carboxylic acid imide.—The ethanolic mother liquor from step I B. above was stored at 0° for 90 hours to give additional crystalline material (237.2 g.), m.p. 183–186°. The filtrate was concentrated to give another crop of colorless crystals (119.9 g.), m.p. 168–177°. Both crops were combined and partitioned between ethyl acetate and aqueous sodium carbonate as described in I.C. above to give a mixture of (+)- and (−)-isomers (221.4 g.), m.p. 125–129°, greatly enriched in the (+)-enantiomer.

(−)-tartaric acid (89.6 g., 0.596 mole) was added to a hot stirred solution of the (+)-enriched mixture (221.4 g., 0.596 mole) in ethanol (3.6 l.) containing water (40 ml.). The stirred mixture was heated to near boiling and then cooled to 25° during 4 hours. The colorless crystalline material was collected, washed with cold 95% ethanol (500 ml.) and dried to give the tartrate salt of the (+)-enantiomer (291.6 g.), m.p. 157–161° (dec.). Recrystallization from acetonitrile gave 247.2 g. of the purified tartrate salt, m.p. 162–164° (dec.).

B. (+)-5-*endo*-benzoyloxy-N-(3 - dimethylaminopropyl)bicyclo[2.2.1]heptane - 2,3 - di-*endo*-carboxylic acid imide.—The tartrate salt from step A (247.2 g.) was decomposed with aqueous sodium carbonate and the liberated (+)-enantiomer extracted into ethyl acetate as described in I.C. Removal of the ethyl acetate left the (+)-isomer (171.6 g.), as colorless crystals: m.p. 131–133.5°; $[\alpha]_D^{25}$ +77.74° (c. 1-.89, ethanol).

C. (+)-5-*endo*-benzoyloxy-N-(3 - dimethylaminopropyl)bicyclo[2.2.1]heptane - 2,3 - di-*endo*-carboxylic acid imide hydrochloride.—The (+)-enantiomer (171.6 g.) from step B was treated with an equivalent of ethanolic hydrogen chloride as described for the (−)-enantiomer in I D. to give colorless crystals of the (+)-enantiomer HCl, (188.2 g.): m.p. 207–209°; $[\alpha]_D^{25}$ +85.88° (c. 1.36, water).

Example 21

Preparation of 5-*endo*-benzolyloxy-N-(2-dimethylaminoethyl)bicyclo[2.2.1]heptane - 2,3 - di-*endo*-carboxylic acid imide (Ij)

Substitution in the procedure of example 3 for the "appropriate" benzoyl halide used therein of an equimolar quantity of benozyl chloride and for the dicarboxylic acid imide an equimolar quanity of IIIb obtained in example 13, produces the title compound.

Example 22

Preparation of 5-*endo*-Nitrobenzolyloxy-N-(3-piperidinopropyl)bicyclo[2.2.1]heptane - 2,3 - di-*endo*-carboxylic Acid Imide (Ik)

Substitution in the procedure of example 3 for the "appropriate" benzoyl halide used therein of an equimolar quanity of 4-nitrobenzoyl chloride and for the dicarboxylic acid imide III used therein of IIIe produced the title compound.

Example 23

Preparation of 5-*endo*-benzolyloxy-N-(2-dimethylaminoethyl)bicyclo[2.2.1]heptane - 2,3 - di-*endo*-carboxylic acid imide Substitution in the procedure of example 3 for the "appropriate" benzoyl halide used therein of an equimolar quantity of benzoyl chloride and for the dicarboxylic acid amide III used therein an equimolar quantity of IIIb produces the title compound.

Example 24

Preparation of 5-*endo* - 3,4,5 - trimethoxybenzoyl-N-(2-dimethylaminoethyl)bicyclo[2.2.1]heptane - 2,3 - di-*endo*-carboxylic acid imide (Im)

Substitution in the procedure of example 3 for the "appropriate" benzoyl halide used therein of an equimolar quanity of 3,4,5-trimethoxybenzoyl chloride and for the dicarboxylic acid imide III used therein an equimolar quantity of IIIb produced the title compound.

*Anal.*

Calc'd for $C_{23}H_{30}O_7N_2 \cdot HCl \cdot \frac{1}{3} H_2O$: C, 56.44; H, 6.54; N, 5.71.

Found: C, 56.63; H, 7.08; N, 5.91.

Example 25

Preparation of 5-*endo*-Benzoyloxy-N-(3 - methylaminopropyl)bicyclo[2.2.1]heptane - 2,3 - di-*endo*-carboxylic acid imide hydrochloride (Ij)

A. 5-*endo*-benzoyloxy-N-[3-(2,2,2-trichloroethoxycarbonyl) - 3 - methylaminopropyl]bicyclo[2,2.1]heptane-2,3-di-*endo*-carboxylic acid imide.—Under anhydrous conditions there was added 4.66 g. (22 mmoles) of trichloroethyl chloroformate to a mixture of 3.7 g. (10 mmoles) of compound Ib and 2.0 g. (14.5 mmoles) potassium carbonate in 50 ml. benzene. The reaction mixture was refluxed for 18 hours. After cooling, ethyl acetate was added and the solution was filtered from the insolubles. The filtrate was washed with water, 5% $K_2O_3$, HCl, water and brine. After drying ($Na_2SO_4$) and filtration the solvents were evaporated. In this manner there was obtained a crude product which when recrystallized from ethyl acetate-Skellysolve B (essentially n-hexane) afforded 3.5 g. (65.7%) of pure title product; m.p. 104–107° C.

*Anal.*

Calc'd for $C_{23}H_{24}Cl_3N_2O_6$: C, 51.94; H, 4.74%; N, 5.27%.

Found: C, 51.75%; H, 4.76%; N, 5.08%.

B. 5-*endo*-benzoyloxy - N - (3-methylaminopropyl)bicyclo[2.2.1]heptane-2,3-di-*endo*-carboxylic acid imide hydrochloride.—Zinc dust (11.0 grams) was added to a solution of 5.56 g. (10.5 mmoles) of the compound prepared in A above in 120 ml. of 90% acetic acid. The resulting reaction mixture was stirred at room temperature for four hours. The mixture was filtered and the filtrate evaporated to dryness. The residue was made basic by the addition of sodium bicarbonate and again was evaporated to dryness. Benzene (500 ml.) and $Na_2SO_4$ was added to the residue. The mixture was filtered; the filtrate was evaporated and the residue was dissolved in methanol. Some ether was added, and the hydrochloride salt was prepared with anhydrous hydrogen chloride gas. The precipitated salt was collected and after several recrystallizations from methanol-ether, there was obtained a 72% yield of title compound (Ij), m.p. 196–199° C.

Anal.

Calc'd for $C_{20}H_{24}N_2O_4 \cdot HCl \cdot 0.2H_2O$: C, 60.45%; H, 6.40%; N, 7.05%; KF($H_2O$), 1.13%.
Found: C, 60.62%; H, 6.44%; N, 7.05%; KF($H_2O$), 1.13%.

Example 26

Preparation of 5-*endo*-benzoyloxy-N-(3-aminopropyl)bicyclo[2.2.1]heptane-2,3-di-*endo*-carboxylic acid imide (Ik)

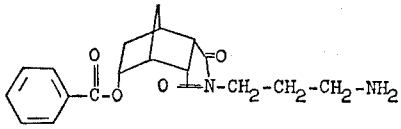

A. 5-*endo*-hydroxy - N - (2-cyanoethyl)bicyclo[2.2.1]heptane-2,3-di-*endo*-carboxylic acid imide (X).—Substitution in the procedure of examples 2 or 4 for the appropriate amine used therein of an equimolar quantity of 2-cyanoethylamine produces the title compound (X).

B. 5-*endo*-benzoyloxy-N-(2-cyanoethyl)bicyclo[2.2.1]heptane-2,3-di-*endo*-carboxylic acid imide (XI).—Substitution in the procedure of example 3 for the appropriate benzoyl halide and imide (III) used therein of equimolar quantities of benzoyl chloride and compound X produces the title compound XI.

C. 5-*endo*-benzoyloxy - N - (3-aminopropyl)bicyclo-[2.2.1]heptane - 2,3 - di - *endo* - carboxylic acid imide (IIIk).—One-tenth mole of compound XI prepared in B above is dissolved in 200 ml. of ethanol and hydrogenated at 60 p.s.i. using Pd/C and hydrogen till two-tenths mole of hydrogen is absorbed to produce compound Ik.

Example 27

Preparation of 5-*endo*-benzoyloxy-N-(3-aminopropyl)bicyclo[2.2.1]heptane-2,3-di-*endo*-carboxylic acid imide (Ik)

A. *endo* - 5 - hydroxy-bicyclo[2.2.1]heptane-*endo*-2[N-(2-cyanoethyl)]carboxamide-*endo* - 3 - carboxylic acid γ-lactone (XX).—

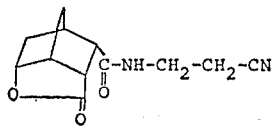

A mixture of lactone-acid II (18.2 g.; 0.1 mole), 150 ml. $SOCl_2$ and 250 ml. $CH_2Cl_2$ containing 4 drops of DMF (dimethylformamide) was refluxed (60° C.) for 3 hours. After evaporating to dryness, benzene was added and removed under reduced pressure. After dissolving the acid chloride in 350 ml. $CH_2Cl_2$, there was added dropwise with vigorous stiring a solution of 3-aminopropionitrile (15.3 g.; 0.21 mole) in 150 ml. $CH_2Cl_2$. The resulting reaction mixture was refluxed for 2 hours. After cooling and filtering the insoluble materials, the filtrate was evaporated to dryness. The residue, so obtained, was slurried with a small amount of $CH_3CN$ to which ether was carefully added. In this way, the crystalline product was obtained in 85.5% yield with m.p. 129–135° C. A sample on recrystallization from $CH_3CN$ gave analytically pure material, m.p. 145–147° C.

Anal.

Calc'd for $C_{12}H_{14}N_2O_3$: C, 61.52; H, 6.02; N, 11.96.
Found: C, 61.54; H, 6.28; N, 11.96.

B. *endo*-5-benzoyloxy-N-(2-cyanoethyl)bicyclo[2.2.1]heptane-*endo*-2,3-dicarboxylic acid imide (XI).—

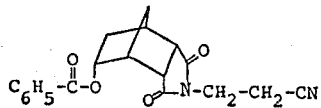

To a solution of lactone-amide XX (16 g.; 0.068 mole) in 200 ml. pyridine was added slowly the benzoyl chloride (14.4 g.; 0.102 mole). The resulting reaction mixture was heated at 110° C. for four hours. After evaporation to dryness, 5% $K_2CO_3$ was added and the mixture was extracted with ethyl acetate. The extracts were washed with brine, dried over $Na_2SO_4$, filtered and evaporated to dryness. Addition of ethanol and petroleum ether to the residue afforded crystalline product. A yield of 90.5%, m.p. 145–147° C., was realized after drying at 70° C. under high vacuum for 16 hours. A sample recrystallized from EtOH-petroleum ether and dried at 60° C. gave analyticaly pure product, m.p. 143–145° C.

Anal.

Calc'd for $C_{19}H_{18}N_2O_4$: C, 67.44; H, 5.36; N, 8.28.
Found: C, 67.34; H, 5.69; N, 8.07.

C. endo - 5 - benzoyloxy-N-(3-aminopropyl)bicyclo[2.2.1]heptane-endo-2,3-dicarboxylic acid imide hydrochloride (Ik).—A mixture of imide-nitrile XI (1.0 g.; 2.96 mmole), 200 mg. 10% Pd on carbon, 5 ml. 5N HCl, and 95 ml. ethanol was shaken under hydrogen at room temperature for 19 hours. After this time, water was added to the reaction mixture until all the solids dissolved. The catalyst was removed and the filtrate was evaporated to dryness, thereby affording an 86% yield of crystalline product, mp 280–282° C. A sample recrystallized from $CH_3OH$—$Et_2O$ and dried at 60° C. under high vacuum afforded pure product, mp 286–288° C. This material was hygroscopic and retained water tenaciously.

Anal.

Calc'd for $C_{19}H_{22}N_2O_4$ HCl: C, 60.23; H, 6.12; N, 7.40.
Found (corrected for $H_2O$): C, 60.20; H, 6.19; N, 7.52.

Example 28

Preparation of 5-*endo*-hydroxy-bicyclo[2.2.1]heptane-2,3-di-*endo*-carboxylic acid-γ-lactone, II The procedure of Koch et al., was essentially used. A total of 50.0 g. of *endo-cis*-bicyclo[2.2.1]hept-5-ene-2,3-dicarboxylic anhydride in 500 ml. of concentrated HCl was refluxed for 5 hours. The reaction mixture was cooled after this time and the precipitated solids were collected by filtration and washed thoroughly with ice-cold water. After drying, there was obtained 36.0 g. (64%) of product, mp 196–200°. This material was suitable without further purification for the next step.

References: H. Koch, J. Kotlan, and T. Markut, Monatsh, Chem., 96, 1646–57 (1965).

Example 29

Preparation of 5 *endo*-benzoyloxy-N-(3-dimethylaminopropyl)bicyclo[2.2.1]heptane - 2,3 - di-*endo*-carboxylic acid imide hydrochloride, Ib (A) Reflux 2.5 hours
   72 g. (0.4 mole) lactone-acid II
   1000 ml. $CH_2Cl_2$
   300 ml. $SOCl_2$
   10 drops DMF
(B) Reflux 2 hours
   40.8 g. (0.4 mole) 3-dimethylaminopropylamine
   1600 ml. $CH_2Cl_2$
(C) Reflux 1 hour
   84.0 g. (0.6 mole) benzoyl chloride
   600 ml. pyridine (A) A mixture of the lactone-acid II, SOCl$_2$ and 10 drops DMF in 1000 ml. CH$_2$Cl$_2$ was refluxed for 2.5 hours. After this time, the solvent was removed under reduced pressure.

(B) To the acid-chloride obtained above was added 1000 ml. CH$_2$Cl$_2$ followed by rapid dropwise addition of the amine dissolved in 600 ml. CH$_2$Cl$_2$. The resulting reaction mixture was refluxed for 2 hours.

(C) To the above reaction mixture after cooling was added 600 ml. pyridine followed by the benzoyl chloride (rapid stream). The resulting mixture was refluxed for 1 hour. After this time, the solvents were removed under reduced pressure to yield a hard solid. The solid was treated with 3 liters of 5% K$_2$CO$_3$ and the product was extracted with 3× 500 ml. ethyl acetate. The combined extracts were washed with brine, dried (Na$_2$SO$_4$) and stripped. The residue oil was taken up in 500 ml. CH$_3$OH and treated with gaseous HCl to form the salt. Addition of 300 ml. dry ether caused the precipitation of a whitet crystalline solid. After filtration and washing well with ether, the material was air dried for 24 hours. There was obtained 106 g. (65.5%) of product, mp 246–247° C.

Notes

The procedures described above are not considered to be optimal. Compound Ib can be recrystallized from methanol or 95% ethanol.

The product Ib retains solvents of recrystallization very strongly. It is necessary to heat the salt at 55° C. under vaccum to remove all traces of solvent.

Completely anhydrous Ib is very hygroscopic and difficult to handle. The compound can take up as many as 3 molar equivalents of water. A stable monohydrate is also formed. The degree to which the material becomes hydrated depends on the humidity of the lab in which the solid was left standing in the open air. Equilibration takes anywhere from 1–5 days. Once the material becomes hydrated, it is easily handled.

We claim:

1. A compound having the formula

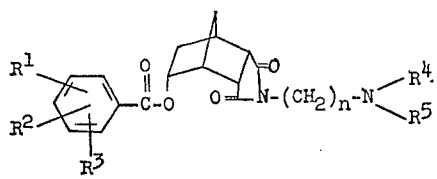

wherein R$^1$, R$^2$ or R$^3$ is H, Cl, Br, F, (lower)alkyl nitro, OH or (lower)alkoxy, $n$ is an integer of 2 to 4 inclusive and R$^4$ and R$^5$ are H, (lower)alkyl or when taken together with the nitrogen a radical of the formula

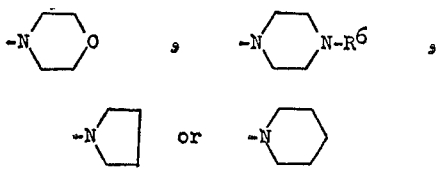

in which R$^6$ is (lower)alkyl; or a pharmaceutically acceptable acid addition salt thereof.

2. A compound of claim 1 having the formula

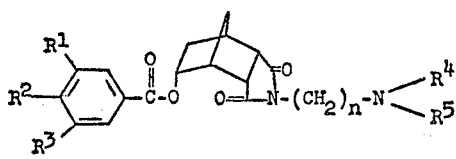

wherein R$^1$, R$^2$ or R$^3$ is H, Cl, Br, F, (lower)alkyl nitro, OH or (lower)alkoxy, $n$ is an integer of 2 to 4 inclusive and R$^4$ and R$^5$ are (lower)alkyl or when taken together with the nitrogen a radical of the formula

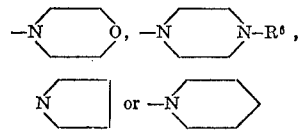

in which R$^6$ is (lower)alkyl; or a pharmaceutically acceptable acid addition salt thereof.

3. A compound of claim 2 wherein R$^1$, R$^2$ or R$^3$ is H, F, Cl, nitro or (lower)alkoxy, R$^4$ and R$^5$ are H, (lower)alkyl or when taken together with the nitrogen a radical of the formula

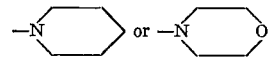

4. A compound of claim 2 wherein R$^1$, R$^2$ or R$^3$ is H, Cl, F, nitro or (lower)alkoxy, R$^4$ and R$^5$ are (lower)-alkyl or when taken together with the nitrogen a radical of the formula

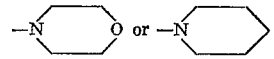

5. A compound of claim 2, wherein R$^1$, R$^2$ and R$^3$ are (lower)alkoxy, R$^4$ and R$^5$ are H, (lower)alkyl or when taken together with the nitrogen a radical of the formula

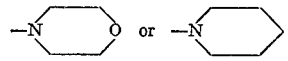

6. A compound of claim 2 wherein R$^1$ and R$^3$ are hydrogen, R$^2$ is NO$_2$, hydrogen or chloro, R$^4$ and R$^5$ are (lower)alkyl or when taken together with the nitrogen a radical of the formula

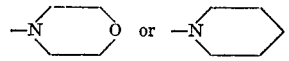

7. The compound of claim 2 wherein R$^1$ and R$^3$ are hydrogen, R$^2$ is chloro, $n$ is an integer of 3 and R$^4$ and R$^5$ are methyl; or the hydrochloride salt thereof.

8. The compound of claim 2 wherein R$^1$, R$^2$ and R$^3$ are hydrogen, $n$ is an integer of 3 and R$^4$ and R$^5$ are methyl; or the hydrochloride salt thereof.

9. The compound of claim 2 wherein R$^1$, R$^2$ and R$^3$ are hydrogen, $n$ is an integer of 2 and R$^4$ and R$^5$ are methyl or the hydrochloride salt thereof.

10. The compound of claim 2 wherein R$^1$ and R$^3$ are hydrogen, R$^2$ is nitro, $n$ is an integer of 3, and R$^4$ and R$^5$ taken together with the nitrogen is a radical of the formula

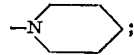;

or the hydrochloride salt thereof.

11. The compound of claim 5 wherein R$^1$, R$^2$ and R$^3$ are methoxy, $n$ is an integer of 3 and R$^4$ and R$^5$ are methyl; or the hydrochloride salt thereof.

12. The compound of claim 5 wherein R$^1$, R$^2$ and R$^3$ are methoxy, $n$ is an integer of 2 and R$^4$ and R$^5$ are methyl; or the hydrochloride salt thereof.

13. The compound of claim 2 wherein R$^1$ and R$^3$ are hydrogen, R$^2$ is chloro, $n$ is an integer of 3 and R$^4$ and R$^5$ taken together with the nitrogen is a radical of the formula

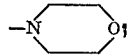

or the hydrochloride salt thereof.

14. The compound of claim 2 wherein R$^1$ and R$^3$ are hydrogen, R$^2$ is nitro, $n$ is an integer of 3 and R$^4$ and R$^5$ are methyl; or the hydrochloride salt thereof.

15. The compound of claim 2 wherein R$^1$ and R$^3$ are hydrogen, R$^2$ is nitro, $n$ is an integer of 3 and R$^4$ and $R^5$ when taken together with the nitrogen is a radical of the formula

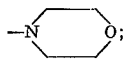

or the hydrochloride salt thereof.

16. The compound of claim 2 wherein $R^1$ and $R^3$ are hydrogen, $R^2$ is chloro, hydrogen or nitro, $n$ is an integer of 3 and $R^4$ and $R^5$ are each (lower)alkyl; or the hydrochloride salt thereof.

17. The essentially pure levorotatory isomers of the compound of claim 2.

18. The essentially pure dextrorotatory isomers of the compound of claim 2.

19. The essentially pure levorotatory isomer of the compound of claim 8.

20. The essentially pure dextrorotatory isomer of the compound of claim 8.

21. The compound of claim 2 wherein $R^1$ and $R^3$ are hydrogen, $R^2$ is chloro, $n$ is an integer of 3 and $R^4$ and $R^5$ taken together with the nitrogen is a radical of the formula

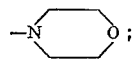

of the hydrochloride salt thereof.

22. The compound of claim 2 wherein $R^1$, $R^2$ or $R^3$ is H, Cl, Br, F, (lower)alkyl, nitro, OH or (lower)alkoxy, $n$ is an integer of 2 to 4 inclusive and $R^4$ is H, $R^5$ is H or (lower)alkyl; or a pharmaceutically acceptable acid addition salt thereof.

23. The compound of claim 22 wherein $R^5$ is H, methyl, ethyl or propyl.

24. The compound of claim 22 wherein $R^5$ is methyl.

25. The essentially pure levorotatory isomer of the compound of claim 24.

26. The essentially pure dextrorotatory isomer of the compound of claim 24.

27. A mono or polyhydrate of the compounds of claim 1.

28. A mono or polyhydrate of the compounds of claim 2.

29. The mono or trihydrate of the compounds of claim 8.

30. The mono or trihydrate of the compound of claim 19.

31. The mono or trihydrate of the compound of claim 20.

32. The mono or polyhydrates of the compounds of claim 22.

References Cited

UNITED STATES PATENTS 3,607,876  9/1971  Bailey _____ 260—294 AC

G. THOMAS TODD, Primary Examiner

U.S. Cl. X.R.

260—268 TR, 293.61, 326 C, 343.3; 424—248, 250, 267, 274